(12) United States Patent
Khivesara et al.

(10) Patent No.: US 9,088,428 B2
(45) Date of Patent: *Jul. 21, 2015

(54) LOCATION SPECIFIC EVENT BROADCASTING

(71) Applicant: Roundbox, Inc., Florham Park, NJ (US)

(72) Inventors: Amit Khivesara, Clifton, NJ (US); Xiaofeng Liu, Edison, NJ (US); Peter Andrew Mataga, Sparta, NJ (US); Igor Slepchin, Caldwell, NJ (US); Cary Torkelson, Allendale, NJ (US); Vinod Valloppillil, San Francisco, CA (US); Edgar Villanueva, Rockaway, NJ (US)

(73) Assignee: ROUNDBOX, INC., Forham Park, NJ (US)

( * ) Notice: Subject to any disclaimer, the term of this patent is extended or adjusted under 35 U.S.C. 154(b) by 209 days.

This patent is subject to a terminal disclaimer.

(21) Appl. No.: 13/705,006

(22) Filed: Dec. 4, 2012

(65) Prior Publication Data

US 2013/0166735 A1 Jun. 27, 2013

Related U.S. Application Data

(60) Division of application No. 13/355,421, filed on Jan. 20, 2012, now Pat. No. 8,325,747, which is a continuation of application No. 12/022,914, filed on Jan. 30, 2008, now Pat. No. 8,102,864, which is a (Continued)

(51) Int. Cl.
| | |
|---|---|
| *H04L 12/18* | (2006.01) |
| *H04L 12/26* | (2006.01) |
| *H04L 12/54* | (2013.01) |
| *H04L 12/801* | (2013.01) |

(Continued)

(52) U.S. Cl.
CPC ........ *H04L 12/1881* (2013.01); *H04L 12/5695* (2013.01); *H04L 43/04* (2013.01); *H04L 47/15* (2013.01); *H04L 47/2475* (2013.01); *H04W 4/06* (2013.01); *H04W 4/22* (2013.01)

(58) Field of Classification Search
CPC ....... H04W 76/007; H04W 4/06; H04W 4/22; G08B 27/006
USPC ............ 370/400, 401, 503; 455/404.1, 404.2; 725/33, 34, 35, 45, 46, 135, 136
See application file for complete search history.

(56) References Cited

U.S. PATENT DOCUMENTS

| | | |
|---|---|---|
| 6,590,885 B1 | 7/2003 | Jorgensen |
| 6,671,724 B1 | 12/2003 | Pandya et al. |

(Continued)

OTHER PUBLICATIONS

U.S. Appl. No. 12/022,914, Non-Final Office action, mailed Feb. 8, 2011, 6 pages.

(Continued)

*Primary Examiner* — Raj Jain
(74) *Attorney, Agent, or Firm* — Kilpatrick Townsend & Stockton LLP

(57) ABSTRACT

Applications in a broadcast environment distribute events in real-time to a large number of receivers within specified geographic locations while efficiently sharing bandwidth resources with other applications using the same broadcast network. Applications need not be aware of the other applications sharing the resources, nor of the methods, protocols, and other mechanisms used to actually broadcast the data over the broadcast medium. Server-side applications that serve data, send notifications, or distribute events to specific locations within the network use a broadcast location manager. Client applications that receive such data, notifications, or events use a client location filter to obtain events that are relevant based on the location of the device. The broadcast location manager and client location filter work together to reliably and efficiently transmit data, notifications, and events to specific locations over the broadcast network for all applications involved.

16 Claims, 7 Drawing Sheets

Related U.S. Application Data continuation-in-part of application No. 11/626,707, filed on Jan. 24, 2007, now Pat. No. 8,149,771.

(60) Provisional application No. 60/763,385, filed on Jan. 31, 2006, provisional application No. 60/816,322, filed on Jun. 26, 2006, provisional application No. 60/868,868, filed on Dec. 6, 2006.

(51) Int. Cl.
*H04L 12/859* (2013.01)
*H04W 4/06* (2009.01)
*H04W 4/22* (2009.01)

(56) References Cited

U.S. PATENT DOCUMENTS

| | | | |
|---|---|---|---|
| 6,731,625 B1 | 5/2004 | Eastep et al. | |
| 6,871,233 B1 | 3/2005 | Bearden et al. | |
| 7,289,964 B1 | 10/2007 | Bowman-Amuah | |
| 7,616,942 B2 * | 11/2009 | Karl et al. | 455/404.1 |
| 8,102,864 B2 * | 1/2012 | Khivesara et al. | 370/401 |
| 8,325,747 B2 * | 12/2012 | Khivesara et al. | 370/401 |
| 2002/0064149 A1 | 5/2002 | Elliott et al. | |
| 2007/0054739 A1 * | 3/2007 | Amaitis et al. | 463/42 |
| 2007/0198656 A1 | 8/2007 | Mazzaferri et al. | |

OTHER PUBLICATIONS

U.S. Appl. No. 12/022,914, Notice of Allowance, mailed Sep. 19, 2011, 5 pages.

PCT/US07/61036, International Search Report, mailed Feb. 5, 2008, 3 pages.

PCT/US09/32344, International Search Report and Written Opinion, mailed Jan. 11, 2010, 11 pages.

* cited by examiner

LOCATION SPECIFIC EVENT BROADCASTING

CROSS-REFERENCES TO RELATED APPLICATIONS

This application is a divisional of U.S. patent application Ser. No. 13/355,421, entitled "Location Specific Event Broadcasting," filed Jan. 20, 2012, which application is a continuation of U.S. patent application Ser. No. 12/022,914, entitled "Location Specific Event Broadcasting," filed Jan. 30, 2008, which application is a continuation-in-part of U.S. patent application Ser. No. 11/626,707, entitled "Reliable Event Broadcaster with Multiplexing and Bandwidth Control Functions," filed on Jan. 24, 2007, which claims the benefit of the following United States patent applications: (1) U.S. provisional patent application No. 60/763,385, entitled "Reliable Event Stream Distributor," filed Jan. 31, 2006; (2) U.S. provisional patent application No. 60/816,322, entitled "Reliable Event Broadcaster," filed Jun. 26, 2006; and (3) U.S. provisional patent application No. 60/868,868, entitled "Reliable Event Broadcaster With Multiplexing And Bandwidth Control Functions," filed Dec. 6, 2006, the contents of which are hereby incorporated in their entirety by reference.

TECHNICAL FIELD

This invention relates to the distribution of events, notifications, and other data to applications running on client devices in a broadcast network environment. More specifically, this invention relates to the efficient usage of the broadcast medium to support location directed distribution of data from serving applications to receiving applications sharing the same broadcast resources.

BACKGROUND

The increasing adoption of data services by users has resulted in a related increase in the types of such services available, and in the variety of data and applications of interest to those users. Users of mobile wireless devices may receive sports information, news, stock quotes, and real-time data specific to a particular application executing on their device, as well as emergency notifications and location specific data.

However, the use of mobile wireless devices such as mobile phones, PDAs, and wirelessly connected laptop computers introduces certain factors into any system designed to deliver data to applications executing on those devices, where some of the factors may not be significant or relevant in a fixed high-speed bidirectional communications system (such as an Internet based communications system). For example, a situation in which a mobile device must communicate with a central data store or server over a wireless network may introduce bandwidth constraints, latency concerns, intermittent connectivity problems, and prohibitive cost into any system designed to transfer data and content to a user of a client device. In addition, the lower available bandwidth as compared to a high-speed wire line network may place constraints on the type or complexity of the data or content that can be effectively delivered. Also, mobile networks typically can not handle a large number of simultaneous client-initiated unicast (i.e., individually addressed server to client communications) transactions without severe adverse impact on other network traffic. Similarly, latency and intermittent connectivity concerns may impact the ability of the client device to communicate with a source of data or content to confirm delivery of content. In addition, mobile and other specialized devices typically have characteristics that impose constraints on the storage and processing of data that are not present when using desktop computers or other devices connected to a high speed bidirectional network. These constraints may include display size and resolution, data processing speed, and data storage capacity.

As a result, a threshold issue in determining how best to deliver data to a device is that of the mode of data transfer used for communications between intended recipients and the network infrastructure. In many types of networks, communications between the network infrastructure and individual users may be accomplished by either a point-to-point communication or by the broadcast of data to a group of recipients. Each method of data transfer has certain advantages and associated disadvantages, both with regards to optimal network infrastructure usage and with regards to enabling effective use of the type of data being transferred.

For example, point-to-point communications are most efficient for a relatively small group of recipients, as they may require significant infrastructure overhead in terms of recipient device addressing, allocation of dedicated bandwidth, and management of requests from devices and the related processing of responses to those requests. Another disadvantage of point-to-point communications is that the cost in terms of network resources and overhead is proportional to the number of client devices receiving the transmission, so that costs generally scale directly with the number of recipients.

In contrast, broadcasting data to a larger group of recipients may be more cost-effective and a better way to allocate network infrastructure resources in certain situations and with regards to certain types of data. Broadcasting provides benefits in terms of efficiency and scalability, and the cost for broadcasting data is not directly proportional to the number of recipients. Broadcasting enables data to be delivered efficiently to a larger group of recipients without the need for communicating client-side requests to a server and may be more efficient in terms of resource usage for certain types of applications. Broadcasting is capable of providing comparatively lower cost per bit of data transferred, and for certain applications may be a more practical and effective means of delivering data to interested users.

The type of data or application for which the data is intended may also introduce factors that should be considered in deciding upon the desired mode of data transfer. Certain types of applications require asynchronous, simultaneous distribution of data to a large set of clients. These applications include, but are not limited to, safety alerts, emergency notifications, traffic and extreme weather updates, sporting event updates, news updates, stock quote updates, or other data that is of potential interest to a large group of users and is time sensitive or whose value dissipates rapidly. For such applications, it may be more important to provide the relevant data to a region or section of a network's coverage than to respond to only those users who specifically request the data. In addition, in situations of intermittent or unreliable coverage, the time and network resources required for processing a request-response interaction may not be available when needed.

For these and other reasons, and particularly for bandwidth-constrained data distribution networks such as many mobile data networks, it is often advantageous to utilize a broadcast mode for distribution of events or data. Note that as used herein, the term "events" or "data" refers to data of arbitrary size and type that is meaningful or relevant to the application receiving the data. Examples include a message intended to be displayed to the user of the receiving application, data to be presented within an application (e.g., news, weather, sports information or updates), a video clip to be played to the user, or a data update for the application.

In many cases, events are broadcast to client devices located in a specific region. One method used for location-based delivery broadcasts all events to all locations. The client filters the received events so that the client only processes those events that are targeted to its location. The disadvantage to this solution is that bandwidth to geographic locations where the event is not relevant is wasted since no client in the location will use the event.

Another method used for location-based delivery where applications share the same network resources dedicates bandwidth channels to each application based on the locations where the application plans to send events. The application is guaranteed to have that bandwidth available for delivery of events to each of those locations. However, dedicating channels to each application can be an inefficient use of the total bandwidth. Since most non-streaming applications do not constantly use the bandwidth, there are frequently times where bandwidth goes unused. For example, a sports application sends data only when an event occurs during the sporting event. Even if such events occur once a second, the amount of data sent is so small that a dedicated channel would be unused most of the time.

What are desired are a system and method for efficiently using a broadcast mode of data transfer to manage the location-specific distribution of data to a variety of applications executing on multiple client devices operating in a network, where such system and method overcome the noted disadvantages of existing approaches.

SUMMARY OF THE INVENTION

The present invention permits applications in a broadcast environment to distribute events, notifications and other data reliably in real-time to a large number of receivers within specified geographic locations while efficiently sharing bandwidth resources with other applications using the same broadcast network. Applications need not be aware of the other applications sharing the resources, nor of the methods, protocols, and other mechanisms used to actually broadcast the data over the broadcast medium. An application is guaranteed a minimal level of service for each location it wishes to broadcast to, while network operators retain control over the usage of the resources. Server-side applications that serve data, send notifications, or distribute events to specific locations within the network use a broadcast location manager. Client applications that receive such data, notifications, or events use a client location filter to obtain events that are relevant based on the location of the device. The broadcast location manager and client location filter work together to reliably and efficiently transmit data, notifications, and events to specific locations over the broadcast network for all applications involved.

In some embodiments, the present invention is directed to a method for filtering events. A plurality of events are received at a client device. At least one event is associated with a location tag that identifies a physical location in a network. The physical location is smaller than an area served by the network. The location of the client device is determined. The event is forwarded to an application in the client device if the location of the client device is within the physical location identified by the location tag.

In some embodiments, the present invention is directed to a method for broadcasting events to fine-grained locations in a network. A physical location is identified in a network. The physical location is smaller than an area served by the network. The physical location is mapped to a network address. A fine-grained location is identified within the physical location. An event is to be distributed to client devices within the fine-grained location. Events to be distributed to the fine-grained location are tagged with a location restriction. The events are broadcast to the physical location. The events are filtered based on the location restriction such that only client devices located within the fine-grained location process the events.

In some embodiments, the present invention is directed to a system for broadcasting events to fine-grained locations in a network. The system includes a broadcast location manager installed on a server and a client location filter installed on a client device and coupled to the broadcast location manager by a broadcast distribution network. The broadcast location manager includes a policy manager, a topology manager, an intake manager and a broadcast manager. The policy manager defines a physical location in a network to which events are broadcast. The physical location is smaller than an area served by the network. The policy manager also defines a fine-grained location within the physical location. An event is to be distributed to client devices within the fine-grained location. The topology manager generates a client topology table which includes a mapping of location tags to physical locations in the network. Each physical location is identified by a network address. The intake manager provides an event to be distributed to the fine-grained location with a location tag. The broadcast manager broadcasts events to the physical location. The client location filter includes a client topology table manager and an event filter. The client topology table manager receives the client topology table from the topology manager. The event filter determines whether the client device is located in the fine-grained location based on the location tag and the client topology table. The event is forwarded to the corresponding application in the client device when the client device is located in the fine-grained area of the network.

In some embodiments, the present invention is directed to a method for broadcasting events to locations in a network. The method includes identifying a physical location in a network. The physical location is smaller than an area served by the network. The physical location is mapped to a plurality of network addresses. Events are broadcast to client devices in the physical location via a broadcast distribution network.

These and other advantages of the invention will be apparent to those of ordinary skill in the art by reference to the following detailed description and the accompanying drawings.

DETAILED DESCRIPTION OF THE INVENTION

Figure 1:
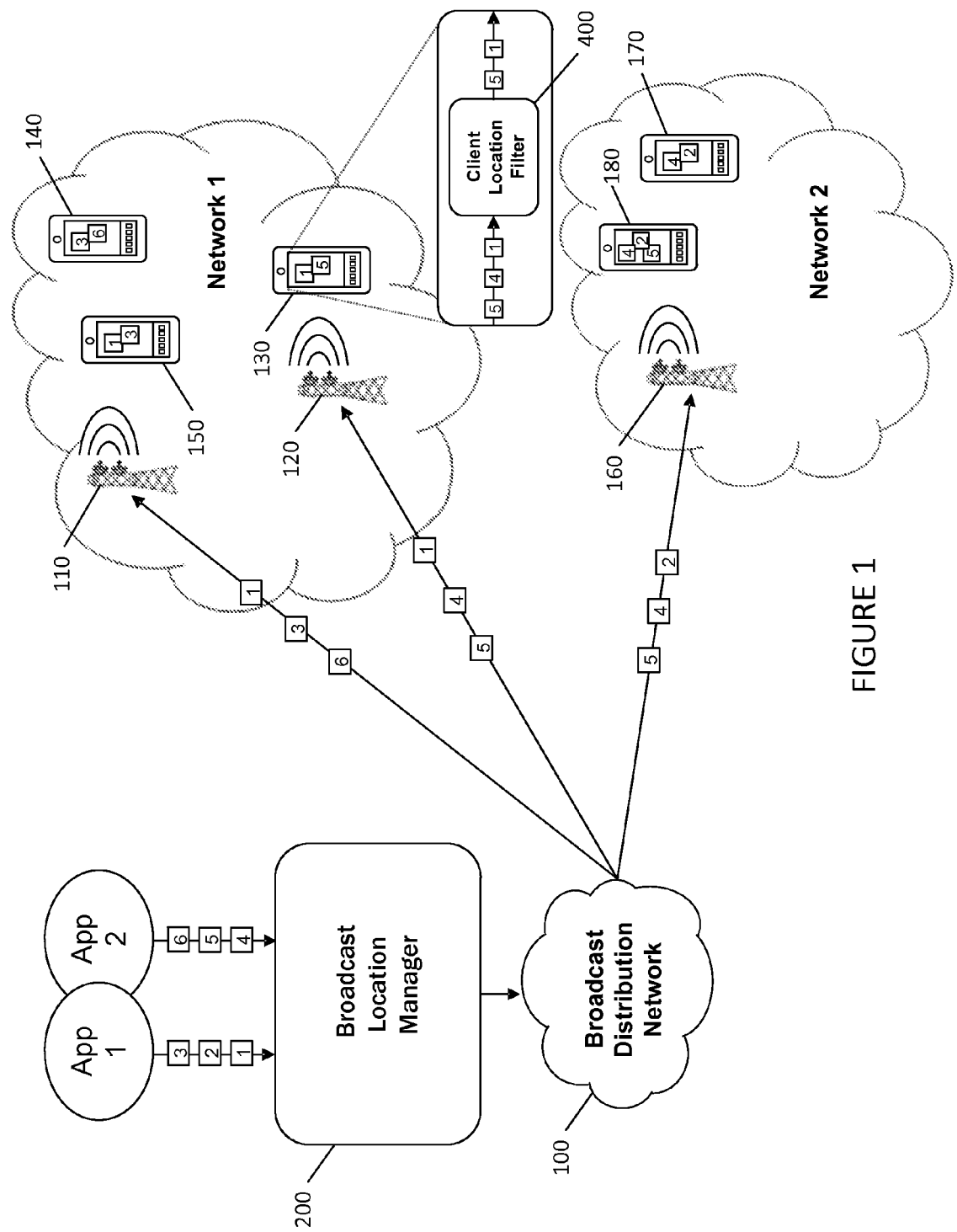
FIG. 1 is a functional block diagram of a system for broadcasting data to specific locations of a wireless network.

Although in portions of the following description the present invention will be discussed with reference to mobile wireless devices operating in a wireless network, it is to be understood that that the inventive systems, apparatus and methods are generally applicable to other types of devices as well, and to networks other than wireless networks (e.g., fixed high-speed bidirectional networks such as an Internet based communications networks, or fixed or wireless bidirectional networks in which communication in one direction is faster than in the other). Applicable devices include, for example, ATM machines, informational kiosks, vending machines, and navigation systems. One example of a situation in which the present invention would be applicable would be an automobile navigation system where there is no or only limited ability for the user device to communicate with the source of the data. Another example is that of an information kiosk that may have limited upstream communications capabilities. In general, the present invention is most applicable to client devices where there is a broadcast mechanism or other efficient data distribution mechanism in one direction (network to many devices), but there is not an efficient/cost-effective or available two-way mechanism to pull data customized for each device. Although the invention provides significant benefits for such networks, as mentioned, in general it may be used in the context of high-speed fixed or wireless bidirectional networks with symmetric or asymmetric communications capabilities.

Definitions

Unless defined otherwise, all technical and scientific terms used herein have the meaning commonly understood by a person skilled in the art to which this invention belongs. As used herein, the following terms have the meanings ascribed to them unless specified otherwise.

Carousel. A carousel is a collection of events that are continually broadcast. When the last event in the carousel is broadcast, broadcast continues with the first event in the carousel. Events may be placed on, or removed from the carousel at any time. Each application using broadcast services is given one or more carousels. Using multiple carousels enables applications to prioritize different classes of events it broadcasts. Events on a carousel do not necessarily need to be delivered in a set order, such as first in first out. Items on a carousel may be broadcast in any arbitrary order either by moving or placing events at the front of the queue, or tagging events using some type of priority system that determines which event will be the next to be broadcast.

Location-based Carousel. A location-based carousel is a carousel that is configured to broadcast events to a particular network location.

Broadcast Location Manager. The broadcast location manager provides a mechanism for applications to direct broadcast events to specific geographic locations over a shared network resource. Applications need not be aware of the other applications sharing the broadcast resources, nor of the methods, protocols, addressing schemes and other mechanisms used to actually broadcast the data over the broadcast medium.

Client Location Filter. The client location filter checks location-directed events it receives and using the location table, determines whether the event is targeted for the device based on its current location. If not, the event is discarded.

Event. An event is a piece of data of arbitrary size and type that is meaningful to the application receiving the event. Events can be files, notifications, alerts, media clips, or other data objects. Events may be sent one after another or only occasionally, depending on the application.

Session. A session is setup whenever an application has events to distribute. Application clients subscribe to sessions to receive events. Sessions have certain characteristics that determine how events using the channel get broadcast. Example characteristics include parameters such as latency, reliability, linger time and location specific information. The location information specifies where events are to be broadcast.

Broadcast Topology Table. The broadcast topology table, provided by the broadcast network operator, defines the physical geographic locations that can be broadcast to and how to address them.

Service Topology Table. The service topology table defines a set of common locations that any application can use to specify where location-based events can be broadcast. The service topology table contains a list of logical location names, and information for mapping those locations to specific network addresses as defined by the broadcast topology table. There need not be a one-to-one correspondence between logical locations names and broadcast topology locations. The service topology table also optionally includes client-based location information for each location defined. This information defines how a client determines whether or not it is currently located in the defined location based on local location information available to the device. The client-based information is used to generate client topology tables to be distributed to clients on the network.

Client Topology Table. The client topology table is used at the client device to determine whether an event should be accepted based on the event's location tag and the device's current location. Locations in the table can be specified in any number of ways, such as GPS polygons, zip codes, or broadcast tower IDs. The table is managed by the server and broadcast to all client devices.

Event Location Tag. An event can be tagged with the location specifying where the event is valid. When present, the client location filter uses the event location tag to determine whether or not the event should be accepted.

Network Location. A network location is an actual geographic location that the underlying broadcast network supports broadcast to. A collection of network locations are defined in the broadcast topology table.

Location. A location is defined by the service provider for use by applications. This allows applications to address location-specific events using the same location names regardless of the physical network being used. Locations can be subsets of network locations, a full or partial combination of one or more network locations, or a disjoint union of either of the above.

Implicit Application Group. An implicit application group is a group of applications that are allowed to broadcast events to the same location. The group is implicitly defined because the applications can broadcast events to the same location.

Explicit Application Group. An explicit application group is an explicitly defined group of applications that share the aggregate bandwidth of a common subchannel.

Subchannel. A subchannel is a full or partial broadcast resource. The broadcast operator typically gives a service provider a particular bandwidth resource over their network. The service provider can divide the bandwidth resource into one or more subchannels, and define groups of applications that can use each defined subchannel. Each subchannel has a defined aggregate bandwidth.

Physical Channel. A physical channel is a location-specific broadcast channel defined by the broadcast network provider.

Location Restriction. A location restriction describes a subset of location. For example, a location restriction for New York State would be New York City. The subset need not necessarily be geographically contiguous. For example, Central Park and Bronx Zoo could be defined as a location restriction for New York City. Multiple location restrictions may be defined for a single location to handle devices which identify their locations using different methodologies. For example, there may be a location restriction defined using GPS polygons, and another location restriction defined using zip codes.

The present invention permits applications in a broadcast environment to distribute events, notifications and other data reliably in real-time to a large number of receivers within specified geographic locations while efficiently sharing bandwidth resources with other applications using the same broadcast network. Applications need not be aware of the other applications sharing the resources, nor of the methods, protocols, and other mechanisms used to actually broadcast the data over the broadcast medium. An application is guaranteed a minimal level of service for each location it wishes to broadcast to, while network operators retain control over the usage of the resources. Server-side applications that serve data, send notifications, or distribute events to specific locations within the network use a broadcast location manager. Client applications that receive such data, notifications, or events use a client location filter to obtain events that are relevant based on the location of the client device.

The broadcast location manager and client location filter work together to allow multiple applications to reliably and efficiently transmit data, notifications, and events to specific locations over a common broadcast network. The broadcast location manager gives server-side applications the ability to publish events that can be directed to specific geographic locations over the broadcast network. The broadcast location manager translates locations specified by applications into network specific instructions for delivery to the appropriate part of the broadcast network. Applications may send events to locations that are more specific than the underlying network allows. In such cases, the broadcast location manager broadcasts the events to the smallest geographic area that covers the location where the application wishes to broadcast.

Client-side applications can further filter events based on more specific, locally known location information using the client location filter such that clients in those locations where the event is not targeted ignore the event. The client location filter running on each of the client devices uses information provided by the broadcast location manager to perform the location-based filtering.

Applications may define and send events to locations that not only are a subset of a location supported by the underlying network, but may overlap one or more subsets of those locations. The broadcast location manager in conjunction with the client location filter may efficiently route the events to those locations.

Broadcast applications cooperate to share bandwidth resources. The applications may often transmit data at the same time, or may not adhere to the bandwidth limitations assigned to them. Applications do not necessarily know about how other applications are using the same broadcast resources. This is especially true for location-based event delivery. Different parts of the network may experience different loads depending on where events are being delivered. The broadcast location manager manages event delivery by maximizing the number of applications that can be deployed by the network operator.

The broadcast location manager provides the aforementioned functions via several components and a number of reliable event broadcaster module plug-ins. The components include a topology manager that provides broadcast network operators, service providers, and application developers a means to efficiently manage and address locations within the physical broadcast network. Location-based plug-ins are provided for a reliable event broadcaster's policy manager, session manager, intake manager, event scheduler, and broadcast manager.

The policy manager provides service providers the ability to enable or restrict where applications can broadcast events, and the bandwidth resources allocated to each application for each location it can broadcast to. The session manager gives applications the ability to define one or more locations where an application session's events will be broadcast, then creates a location-based event carousel for each location for delivery of those events. The intake manager tags events with location information in cases where the event may be received by devices in the network that are outside the desired broadcast location. The event scheduler manages the relative rate at which events for multiple applications destined for the same location are broadcast. The broadcast manager obtains events from the various location-based carousels based on the policies set forth by the event scheduler. The broadcast manager then broadcasts the events over the network using the broadcast network topology rules defined by the broadcast network provider such that multiple location-based carousels are optimized for applications sending events.

The client location filter utilizes event reception and distribution modules of a broadcast client toolkit to filter events received based on location tags that may be included with the events. The client location filter includes a client topology table manager and an event filter. The client topology table manager obtains, either by monitoring a broadcast, or explicitly requesting, client topology tables. The event filter uses event location tags along with the client topology table and the client device's current location to determine if events that are received are to be forwarded to broadcast client toolkit distribution manager, which is responsible for distributing events to applications running on the device.

FIG. 1 is a functional block diagram of a system for broadcasting data to specific locations of a network. The system includes a broadcast distribution network 100 (e.g., a wireless operator or carrier's network) and a server-side broadcast location manager 200. The broadcast distribution network 100 may serve multiple wireless networks, such as network 1 and network 2. Network 1 includes a first broadcast tower 110 and a second broadcast tower 120 that serve client devices 130, 140, 150 located within network 1. Network 2 includes a third broadcast tower 160 that serves client devices 170, 180 located within network 2. As shown in the figure with reference to client device 130, each client device includes a client location filter 400.

In general, the broadcast location manager 200 delivers events to the broadcast distribution network 100 such that the events may be delivered to specific physical locations in network 1 and network 2. The client location filter 400 in the client device 130 receives the data and discards the events that are not marked for delivery to the location where the client device 130 currently resides. Thus, the events that are marked for delivery to the location where the client device 130 currently resides are provided to the applications on the client device 130 that subscribed to receive the events.

In more detail, broadcast applications (App 1 and App 2) each distribute events that are tagged with a specific network location or set of locations. For example, App 1 distributes events 1, 2 and 3, and App 2 distributes events 4, 5 and 6. The events are provided to the broadcast location manager 200. As described in detail below, the broadcast location manager 200 determines which physical network locations, i.e., IP address(es), should receive the event based on location tags associated with each event.

For example, event 1 includes a tag that corresponds to a physical location in network 1 (e.g., the entire state of New York). To distribute event 1 to the mobile devices in the location corresponding to the location tag, event 1 is provided to both the first and second broadcast towers 110, 120. Similarly, event 6 is associated with a more fine-grained location (e.g., Long Island) and, therefore, is provided to only one broadcast tower that serves that location (e.g., the first broadcast tower 110).

As shown in FIG. 1, the client device 130 receives events 1, 4 and 5 from the broadcast distribution network 100 via the second broadcast tower 120. The location tag associated with event 4 identifies a region in network 1 that does not include the entire range of physical locations served by network 1. For example, the physical location associated with event 4 may be limited to the western portion of New York State. The client device 130 may be located outside the region associated with event 4 (e.g., the device is actually in New York City). In this case, the client device 130 determines that its location is not in the same region identified by the location tag in event 4. Thus, the client location filter 400 discards event 4 such that the client device 130 only processes the events that correspond to the current location of client device 130 (e.g., events 1 and 5).

Figure 2:
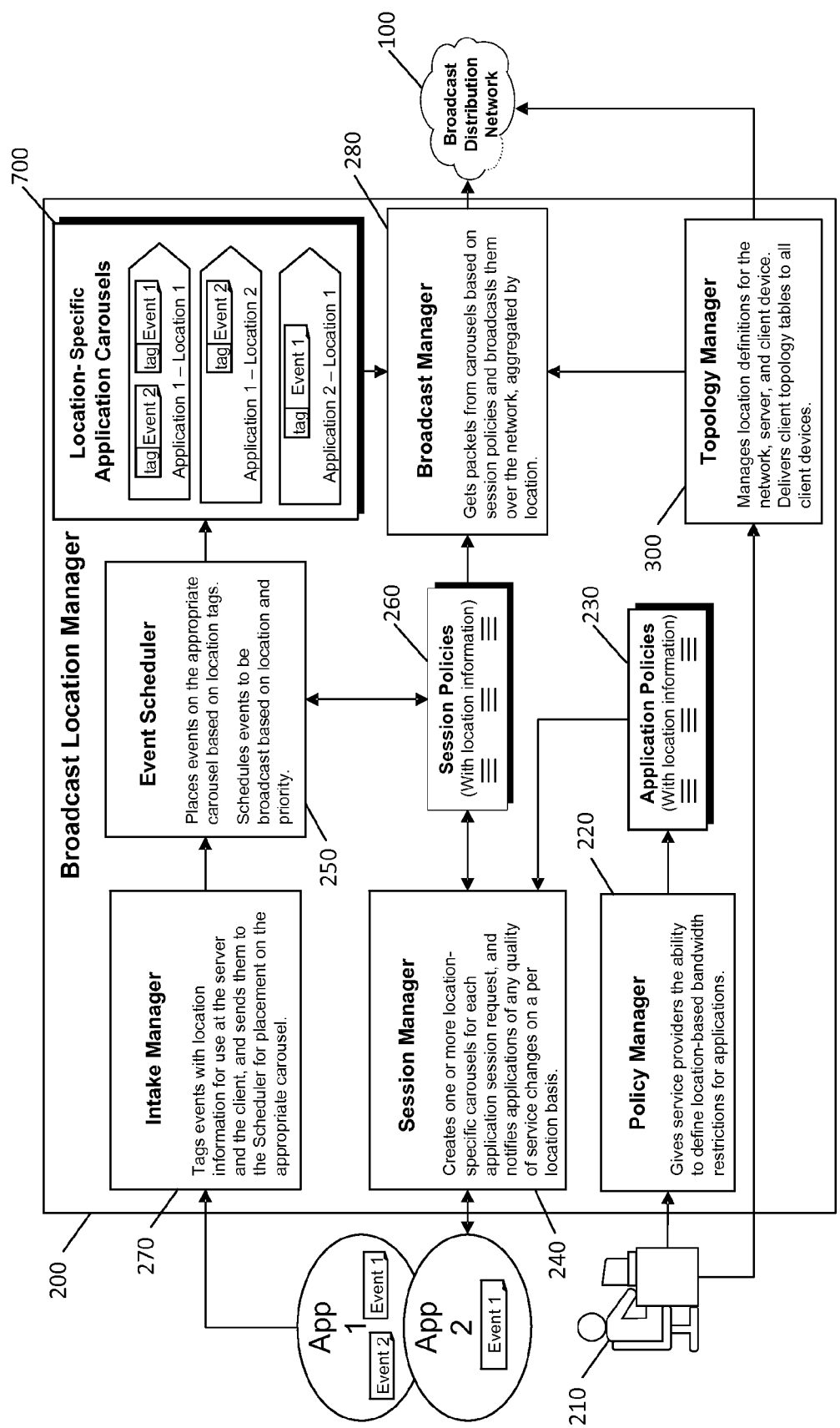
FIG. 2 is a functional block diagram of a broadcast location manager.

FIG. 2 is a functional block diagram illustrating an embodiment of the broadcast location manager 200. The broadcast location manager 200 includes a policy manager, a session manager 240, an event scheduler 250, an intake manager 270, a broadcast manager 280, a topology manager 300 and location-specific application carousels 700. Each component of the broadcast location manager 200 is described in detail below. The overall functionality of the broadcast location manager 200 is described first.

The broadcast network operator 210 specifies the granularity of how geographic locations can be addressed. The granularity may range from being able to address each broadcast tower in a network, to only being able to specify one or two regions in a country. The broadcast network operator 210 provides the broadcast location manager 200 with broadcast topology details. For example, the broadcast network operator 210 defines the network locations and how to address them. The broadcast location manager 200 uses the broadcast topology details to broadcast events to specific locations in the network based on application requests.

The broadcast location manager 200 may simultaneously manage multiple networks (e.g., BCMCS, DVB-H, and MediaFLO). Each network is associated with its own broadcast topology table. The application does not require specific details of any network, and can broadcast events over any or all networks using the same interface. The broadcast location manager 200 handles the translation from application-specified locations to the physical addressing needed for broadcast to that location on each network expressed as, for example, a multicast IP address and port.

The broadcast network operator 210 may define network locations in a variety of ways. For example, network locations may be defined by GPS polygons, zip codes, broadcast tower IDs, or city, state, and country names. The broadcast location manager 200 is configured to understand each addressing scheme and to translate requests made by an application into any of the addressing schemes.

An example of a broadcast topology table is shown below:

| Network Location | Description | Location Specification | Local Interface/ Network Range |
| --- | --- | --- | --- |
| US | United States | (GPS Polygon, Zip Codes, etc.) | (IP addresses/ address range/ports) |
| NYS | New York State | (GPS, zip, etc.) | (addresses/range) |
| NJS | New Jersey State | (GPS, zip, etc.) | (addresses/range) |
| CTS | Connecticut State | (GPS, zip, etc.) | (addresses/range) |
| NYC | New York City | (GPS, zip, etc.) | (addresses/range) |

A service provider may utilize the policy manager 220 to create application-specific selection policies 230 that include location-based information. The location-based information may include restrictions on which locations the application may broadcast to, and the bandwidth resources the application is allowed to use for each location to which it may broadcast. For example, a service provider may define the following broadcast topology for the United States which is divided up into five regions:

| Network Location | Aggregate Bandwidth |
| --- | --- |
| Northeast | 100 Kb/sec |
| Southeast | 75 Kb/sec |
| Midwest | 75 Kb/sec |
| Southwest | 50 Kb/sec |
| West | 100 Kb/sec |

The service provider may provision applications and restrict the locations each application can broadcast to, for example:

| Application | Priority | Locations Allowed |
| --- | --- | --- |
| Stock Ticker | Medium | Northeast, West |
| Baseball | Medium | Southeast, Midwest, West |
| National News | Low | All |
| Ski Report | Low | Northeast, Midwest, West |
| Hurricane Alert | High | Southeast, Northeast |

All applications that may broadcast to the same location form an implicit group. An implicit group may be subject to application bandwidth constraints as described in U.S. patent application Ser. No. 11/626,707, filed on Jan. 24, 2007, and entitled "Reliable Event Broadcaster with Multiplexing and Bandwidth Control". Specifically, the sum of the minimum guaranteed bandwidths for all applications in the group may not exceed the aggregate bandwidth available to that physical location. Additionally, for each priority level defined, the sum of the minimum expected bandwidth for all applications at a particular priority level plus the sum of the minimum guaranteed bandwidths for all applications with a lower priority level may not exceed the aggregate bandwidth available to that physical location. The minimum expected bandwidth may be preempted by higher priority sessions when the higher priority sessions become active.

For the examples given above, the following implicit application groups are defined:

| Location | Bandwidth | Implicit Application Group |
| --- | --- | --- |
| Northeast | 100 Kb/sec | Stock Ticker, National News, Ski Report, Hurricane Alert |

-continued

| Location | Bandwidth | Implicit Application Group |
|---|---|---|
| Southeast | 75 Kb/sec | Baseball, National News, Hurricane Alert |
| Midwest | 75 Kb/sec | Baseball, National News, Ski Report |
| Southwest | 50 Kb/sec | National News |
| West | 100 Kb/sec | Stock Ticker, Baseball, National News, Ski Report |

The service provider may choose to define separate bandwidth policies for each location an application can broadcast to, or define a single bandwidth policy that applies to all locations that an application can broadcast to. In either case, the policy manager 220 ensures that the bandwidth policies defined for applications that may broadcast to the same location adhere to the bandwidth definition restrictions.

In the following example, one application is allocated the same bandwidth resources for all regions it can broadcast to, whereas another application is given separate resource allocations for each region it can broadcast to.

| | | Bandwidth Minimums | |
|---|---|---|---|
| Application | Priority | Guaranteed | Expected |
| Hurricane Alert | High | 50 Kb/s | 50 Kb/s |
| National News: | Low | | |
| Northeast | | 10 Kb/s | 25 Kb/s |
| Southeast | | 10 Kb/s | 10 Kb/s |
| Midwest | | 20 Kb/s | 25 Kb/s |
| Southwest | | 25 Kb/s | 40 Kb/s |
| West | | 15 Kb/s | 25 Kb/s |

The service provider may further refine how applications that may broadcast to the same location share bandwidth resources by defining one or more explicit application groups for a particular location. In this case, each application group is allocated a portion of the total bandwidth available to the service provider for that location. Those applications are then subject to constraints based on the allocated bandwidth.

The following table shows an example of explicit application groups defined for the Northeast region:

| Location | Bandwidth | Explicit Application Group |
|---|---|---|
| Northeast - Group 1 | 60 Kb/sec | Stock Ticker, National News |
| Northeast - Group 2 | 40 Kb/sec | Ski Report, Hurricane Alert |

As mentioned above, the policy manager 220 provides service providers the ability to define and manage location-based application policies. This includes defining restrictions as to which locations a particular application can broadcast events to, defining explicit application groups for particular locations, and defining the bandwidth limits for each application. Additionally, the policy manager 220 enforces the bandwidth restrictions for each implicit and explicit application group. These restrictions are enforced by applying the application bandwidth constraints for each implicitly and explicitly defined group. If any group fails, the applications in that group are marked and the service provider is required to modify the bandwidth allocations for one or more of those applications to satisfy the application bandwidth constraints.

When an application creates a session to broadcast events, the application can specify one or more locations where the events broadcast get delivered. By default, the locations are inherited from the application policy. However, the application may specify a subset of the locations defined in the application policy. The application may also specify locations that are more fine-grained than what are provided in the application policy. For example, if the application policy specifies that an application can broadcast events to the Northeast region of the United States, the application may specify, when opening a location-based event session, that it wants to broadcast only to the state of New York. The application can specify a sub-region using a GPS polygon, zip or postal codes, tower identifiers, or any other means allowed by the service provider. The service provider may define a set of more fine-grained locations which define sub-regions regularly used by the application. This feature will be discussed in further detail below.

When verifying that an application's session bandwidth constraints are adhered to, the session manager 240 takes into account the locations each opened session broadcasts to. Locations that do not overlap are grouped separately and need not be counted against each other. In the following example, a national news application broadcasts to five regions of the United States:

| | | Bandwidth Requests | |
|---|---|---|---|
| Session Name | Location | Guaranteed | Expected |
| National Headlines | All | 1 Kb/s | 5 Kb/s |
| Coastal News | Northeast, Southeast, West | 1 Kb/s | 5 Kb/s |
| Farm Report | Midwest, West | 2 Kb/s | 10 Kb/s |
| Northeast Report | Northeast | 2 Kb/s | 15 Kb/s |

Based on the application location-based session requests shown above: 1) the following groups are formed; 2) the application session bandwidth requests are summed; and 3) the results are checked against the application policy to determine if the requests can be satisfied:

| | | Effective Bandwidth Requests | |
|---|---|---|---|
| Location | Session Names | Guaranteed | Expected |
| Northeast | National Headlines, Coastal News, Northeast Report | 4 Kb/s | 25 Kb/s |
| Southeast | National Headlines, Coastal News | 2 Kb/s | 10 Kb/s |
| Midwest | National Headlines, Farm Report | 3 Kb/s | 15 Kb/s |
| Southwest | National Headlines | 1 Kb/s | 5 Kb/s |
| West | National Headlines, Coastal News, Farm Report | 4 Kb/s | 20 Kb/s |

When grouping by location, the locations are the network locations that the broadcast topology allows, not necessarily the locations the application specified when it opened the session. The following table applies to a national news application.

| | | Bandwidth Requests | |
|---|---|---|---|
| Session Name | Location | Guaranteed | Expected |
| National Headlines | All | 1 Kb/s | 5 Kb/s |
| Coastal News | Northeast, Southeast, West | 1 Kb/s | 5 Kb/s |
| Farm Report | Midwest, West | 2 Kb/s | 10 Kb/s |
| Northeast Report | Northeast | 2 Kb/s | 15 Kb/s |
| New York Headlines | GPS polygon for New York State | 1 Kb/s | 10 Kb/s |

-continued

| Session Name | Location | Bandwidth Requests | |
|---|---|---|---|
| | | Guaranteed | Expected |
| New Jersey Headlines | GPS polygon for New Jersey State | 1 Kb/s | 5 Kb/s |
| California Headlines | GPS polygon for California State | 1 Kb/s | 5 Kb/s |

Even though New Jersey and New York do not overlap geographically, based on the broadcast topology granularity, sessions opened to either state are broadcast to, and, therefore, are counted against the Northeast region. Similarly, the session opened to California is counted against the West region. The following grouping and effective bandwidth requests results:

| Location | Session Names | Effective Bandwidth Requests | |
|---|---|---|---|
| | | Guaranteed | Preemptable |
| Northeast | National Headlines, Coastal News, Northeast Report, New York Headlines, New Jersey Headlines | 6 Kb/s | 40 Kb/s |
| Southeast | National Headlines, Coastal News | 2 Kb/s | 10 Kb/s |
| Midwest | National Headlines, Farm Report | 3 Kb/s | 15 Kb/s |
| Southwest | National Headlines | 1 Kb/s | 5 Kb/s |
| West | National Headlines, Coastal News, Farm Report, California Headlines | 5 Kb/s | 25 Kb/s |

The session manager 240 provides applications with the ability to define and manage location-based sessions and enforces the session bandwidth constraints for each network location that an application can broadcast to. The session manager 240 determines if an application's location-based session request adheres to the constraints set up in the application's policy by grouping all sessions the application has open based on network locations that overlap. A session bandwidth constraint is applied for each group. If any group fails, the new session request can not be satisfied.

The session manager 240 also provides application feedback regarding the quality of service each location is experiencing. Each separate network location may experience a different quality of service, since bandwidth management and optimization is applied to each network location separately. This is required because the dynamic mix of traffic is different for each location.

When an application creates a session to broadcast events to a particular location within the network, one or more location-specific application carousels 700 are established to support delivering events to those destinations. The number and destinations of the carousels depend on the application's requirements and the broadcast topology table. One carousel is created for each network destination to which the server has determined events within that session are to be sent. In the following national news application example, three network locations are to be broadcast to: Northeast, Midwest, and West.

| Session Name | Locations | Bandwidth Requests | |
|---|---|---|---|
| | | Guaranteed | Expected |
| Big City Technology Headlines | New York City, Boston, Chicago, San Francisco, Seattle | 2 Kb/s | 10 Kb/s |

The Northeast covers New York City and Boston, the Midwest covers Chicago, and the West covers San Francisco and Seattle. Three location-based carousels are then created. Each carousel may be given a different allocated bandwidth and, therefore, experience a difference in data broadcast quality of service, depending on other application sessions using the same location-based broadcast resource.

By default, events for a particular application session are broadcast to the location or locations specified when the session is opened. However, applications may override the default by specifying a subset of locations to where particular event is broadcast. In such cases, the event is placed on the appropriate carousel or carousels for broadcast to the network location.

A event scheduler 250 determines the order and rate at which events are broadcast to each network location in the broadcast network by using the application-specific selection policies 230, session policies 260, and current carousel states to optimally allocate bandwidth for each network destination in the entire system. The event scheduler 250 allocates bandwidth using the location-based bandwidth allocation procedure described below.

The event scheduler 250 allocates bandwidth to the location-based application sessions. All application sessions that broadcast to the same network location are grouped together, and the aggregate bandwidth available to that location is divided amongst the sessions in the group. The division is accomplished using the bandwidth allocation procedure in which carousels are grouped by network destination, as described with reference to FIG. 7. Bandwidth is then allocated to the group based on the aggregate bandwidth available to that physical destination.

The intake manager 270 tags events with location information, and sends the events to the event scheduler 250 for placement on the appropriate carousel. The intake manager 270 appends location tags to events that are not intended to be used by all client devices that may receive the event. This is particularly useful in situations where the broadcast topology does not support fine-grained control over where events are broadcast. As discussed with reference to FIG. 4, the client location filter 400 examines the tags to determine whether the client device is in the desired location and, if so, accepts the event.

A single event may have more than one location tag if that event is to be distributed to multiple locations. If the client location filter 400 determines that the client device is in any one of those locations, the client location filter 400 accepts the event. The intake manager 270 may optimize event tagging when more than one location is specified by the application. Location tags that may never correspond to parts of the network to which an event is transmitted may be stripped from that event.

Location tags may also specify locations where an event is not to be received. In that case, the client location filter 400 discards the event if the client device is located within the area described by the event location tag. The intake manager 270 may optimize the broadcasting of events by not broadcasting events to network locations where the events may always be discarded by client devices receiving those events.

The broadcast topology table alone is sufficient to enable applications to broadcast events to one or more locations. Applications may broadcast to more precise locations than may be defined in the broadcast topology table by adding a location restriction either to a session or to a specific event. In cases where an event is to be broadcast to a more precise location than the network topology allows, the event is tagged with the more precise location information. The event is then broadcast to the appropriate physical channels as defined in the network topology. The client location filter 400 examines the location tag to determine whether or not the client device is intended to receive the event based on the current location of the client device. Applications can specify disparate or non-contiguous locations by providing one or more location restrictions.

This methodology requires that server-side applications are configured to specify location restrictions, and client-side filters are configured to determine whether or not the client devices are located within the location restriction. This may be accomplished via GPS polygons, zip or postal codes, tower identifiers, or any another method supported by the broadcast network. The broadcast location manager 200 receives location restrictions from server-side applications and determines which physical channels are to be used to broadcast those events. The client location filter 400 uses locally available device location information and the location tags included with an event to determine whether or not the client device is located within the location restriction as specified by the server-side application.

Each broadcast network may require a different method to specify location restrictions. In cases where a server-side application broadcasts events to more than one network, the application may need to specify location restrictions using multiple formats. The broadcast location manager 200 determines the physical channels to use for each network, and tags each event with the location restriction corresponding to the network on which it is broadcast.

These topology requirements create somewhat of a burden on each application to be aware of how location restrictions are specified for each broadcast network. The topology manager 300 abstracts the location restriction details from each application, and provides logical location names that can be used by all applications and are applicable to all broadcast networks.

Figure 3:
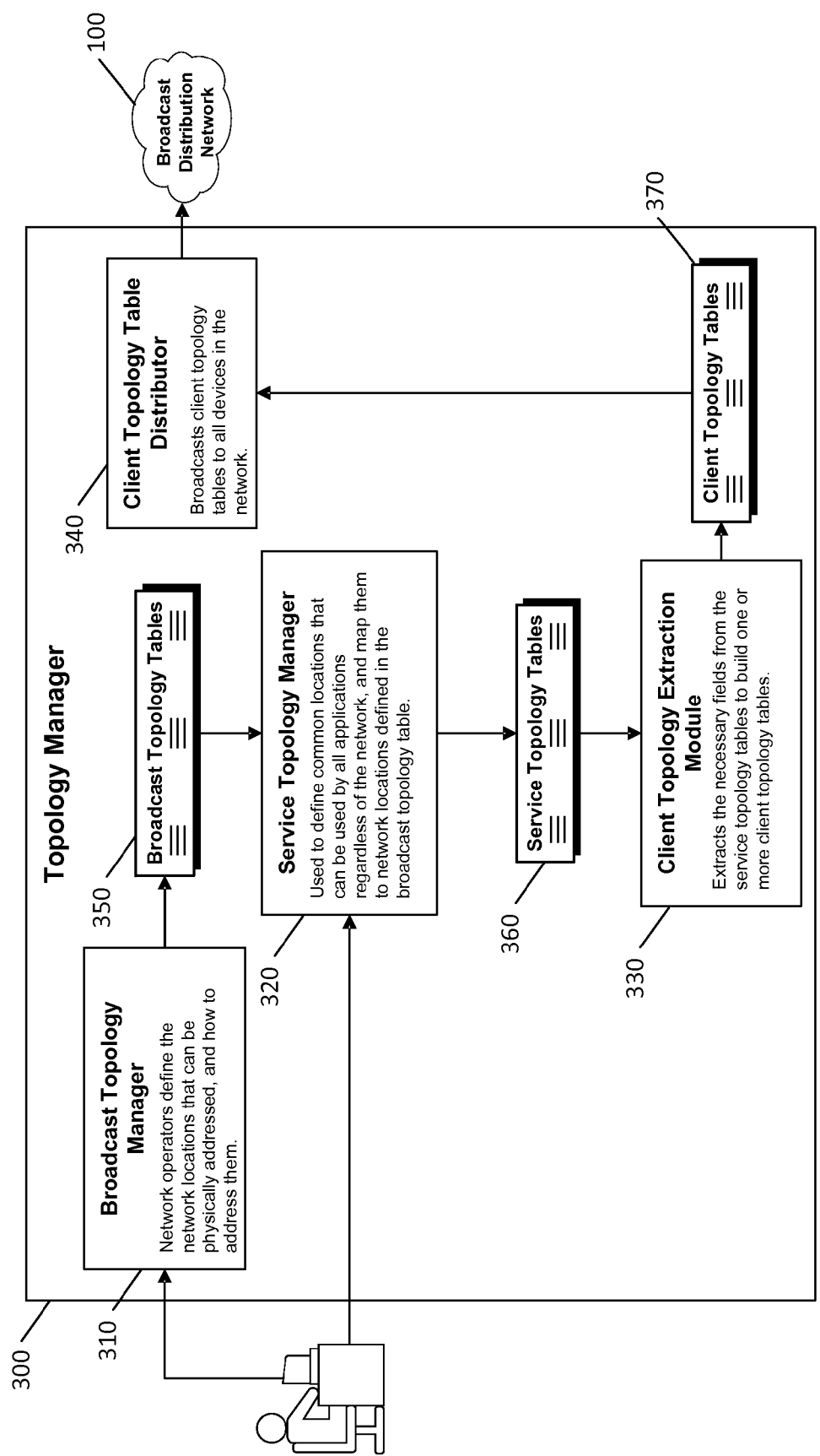
FIG. 3 is a functional block diagram of a topology manager.

FIG. 3 is a functional block diagram of the topology manager 300. The topology manager includes a broadcast topology manager 310, a service topology manager 320, a client topology extraction module 330, and a client topology table distributor 340. These modules of the topology manager 300 allow broadcast network providers and service providers to define and manage broadcast topology tables 350, service topology tables 360, and client topology tables 370.

The broadcast topology manager 310 allows broadcast network operators to define the network locations using the broadcast topology tables 350. The broadcast topology tables 350 define the network locations that can be broadcast to and how to address them.

The service topology manager 320 enables service providers to create and manage the service topology tables 360 to define common locations that can be used by all applications regardless of the network broadcast to. Each location is mapped to one or more network locations defined in the broadcast topology tables 350. The service topology tables 360 contain a list of location names, an optional location tag for use by client devices, and information for mapping those locations to specific network addresses as defined by the broadcast topology tables 350. The service topology tables 360 allow applications to use location names that may map differently to different broadcast networks. There need not be a one-to-one correspondence between locations names and actual broadcast topology locations. Locations defined in the service topology tables 360 may also be used for defining location-based application policies for grouping and bandwidth sharing.

A service provider may only require location-specific datacasting at the granularity of the broadcast topology. In this case, the only meaningful locations are network locations, or combinations of these locations as defined in the service topology, and no finer-grained location is supported. No client-based filtering is needed in this case because all clients receiving an event are by definition in the location, so no location identifier tags are required in broadcast events. However, the broadcast server still provides applications with a transparent mapping to networks and addresses, as well as separate bandwidth management for each network location. Moreover, even in this case, tags may need to be included if events can be processed after an interval of mobility by the client after reception.

A service provider may define finer-grained locations than the broadcast topology supports. In such cases, the service provider maps the finer-grained location to one or more network locations that cover more than the area desired. Since the physical mapping covers an area greater than what is desired, a location restriction is specified by the service provider for the location being defined. The location restriction defines a geographical subset of the network location defined in the broadcast topology tables 350. However, since events are broadcast to the larger network location(s), clients outside the fine-grained location also receive those events. In such cases, the intake manager 270 tags events being broadcast to the finer-grained location with the location identifier so that client devices in the affected areas can filter those events.

For broadcast topologies that do not support fine-grained addressability, there may be entries in the service topology tables 360 that map to the same entry or to multiple entries in the broadcast topology tables 350. The service topology tables 360 may also include location restrictions which may be used by client devices in the network to determine whether or not they are in the defined location. More than one location restriction may be defined to support client devices that determine their locations using different methodologies. For example, one location restriction may be defined using GPS polygons, whereas another location restriction may be defined using zip codes.

Locations defined in the service topology tables 360 need not be contiguous geographically. For example, the service provider may want to define densely populated areas within one or more states and be able to address events to those locations with a single location identifier. The broadcast location manager 200 allows service providers to define such potentially disparate locations and map them into one or more entries in the broadcast topology tables 350 along with the restrictions to those locations.

An example of a service topology table is shown below.

| Location Name | Parent(s) | Description | Location Restriction | Network Location(s) |
|---|---|---|---|---|
| NYNJ | NY, NJ | New York and New Jersey | — | NY, NJ |

| Location Name | Parent(s) | Description | Location Restriction | Network Location(s) |
|---|---|---|---|---|
| Manhattan | NYC | Manhattan | GPS polygon/ zip codes, etc. | NYC |
| TriState | NY, NJ, CT | New York City Tri-state Area | GPS polygon/ zip codes, etc. | NY, NJ, CT |
| Central Park | Manhattan | Central Park | GPS polygon/ zip codes, etc. | NYC |

A parent location may refer to one or more locations defined in the service topology table, or to one or more locations defined in the broadcast topology table, or one or more entries from both tables. The topology manager 300 may create a union of all the restrictions defined in parent entries as well as the location restriction defined for the entry being defined. The union may then be used to determine the physical channels used to broadcast to the location being defined. The union may also be used by a client topology translation module to map the newly defined location into client topologies that are used by client devices to determine whether or not they are located within that location.

Locations may be assigned a location tag, which are added to events that have a location restriction defined. In the example service topology table provided above, the logical location NYNJ does not require locations tags since the logical location is the union of two physical channels, NY and NJ. Events broadcast to both of those physical channels are intended to be received by all client devices in those locations. Events should be processed in a timely manner. Otherwise, applications using those events may need to be aware of client device movement over time, or may need to request the client location filter 400 to reexamine the location tags for an event some time after the event has been received to determine if the event is still applicable to the location in which the client device is currently residing.

The location "Manhattan" requires the use of location tags. "Manhattan" has a location restriction based on the physical channel NYC, which defines the island of Manhattan. Since the physical channel serving that location broadcasts events to all devices in NYC, devices outside Manhattan will receive events destined to that location. In order to have client devices outside Manhattan (but within NYC) ignore those events, a location tag is added to those events. As described with reference to FIG. 4, the client location filter 400 on each client device filters out events destined for Manhattan on devices that are in NYC, but outside of Manhattan.

The client topology extraction module 330 builds a client topology table which includes a subset of the location restrictions defined for a specific client device or class of devices. This reduces the size of the client topology table by removing location restriction information not used by a client device or class of devices. The client topology table maps location tags to the client-specific locations. When an event is tagged with the location specifying where the event is valid, the client uses its current location, the client topology table, and the event's location tag to determine whether the event should be accepted.

The client locations may be specified using GPS polygons, zip codes, cell tower identifiers, or any other method by which a client device determines its location. Different client devices on the same network may identify their locations using different methods. In such cases, the client topology table may contain several different methods to describe locations. Alternatively, multiple client topology tables may be maintained and broadcast. The client device is responsible for obtaining the client topology table with the location descriptions that correspond to its capabilities.

The client topology table is a subset of the service topology table and includes the name of each defined client-specific location (and/or the location tag used to identify that location), and the location restriction that may pertain to a particular class of devices. For example, if a class of devices determines its location via GPS, fields defining location restrictions using other methods, such as zip codes and tower locations, may not be included.

Client topology tables contain a version number so that the client device may determine whether it has the latest version of the client topology table. Events that are tagged also include the client topology table version number required to correctly filter the event.

The client topology extraction module 330 extracts the fields necessary from the service topology table to create the client topology table. These fields include the broadcast location, the location tag (if different), and one of more location restrictions for that location, depending on whether a single or multiple client topology tables are maintained.

The client topology table distributor 340 broadcasts the client topology tables 370 to all client devices in the network. Since client devices are not always monitoring the network, the client topology table distributor 340 rebroadcasts the client topology tables 370 at regular intervals to ensure that client devices entering the network have the most current version.

There may be cases where a client device may not receive the client topology table 370 in a timely manner. This may be due to the client device going in and out of coverage at inopportune moments. In such cases, the client device proactively obtains the client topology table via a client-initiated request. In one embodiment, the client topology table may be obtained by employing a point-to-point data network. In another embodiment, the client topology table may be delivered by existing messaging technologies (e.g., short message service (SMS), multimedia messaging service (MMS), or wireless application protocol (WAP) Push). In a further embodiment, the client topology table may be delivered by over-the-air provisioning (OTAP) which is used to discover parameters from local radio network elements. The client topology table distributor 340 handles these individual client requests for the client topology tables 370. In one embodiment, the number of client devices making such requests is limited so as to avoid flooding the network with point-to-point traffic.

The client topology table distributor 340 may optimize distribution of the client topology tables 370. A client topology table may become very large if a significant number of locations are defined. In such cases, the client topology table distributor 340 may manage multiple tables for different regions, where each table defines locations only within that region. The client topology table distributor 340 then broadcasts the smaller regional table to client devices located within that region.

Figure 4:
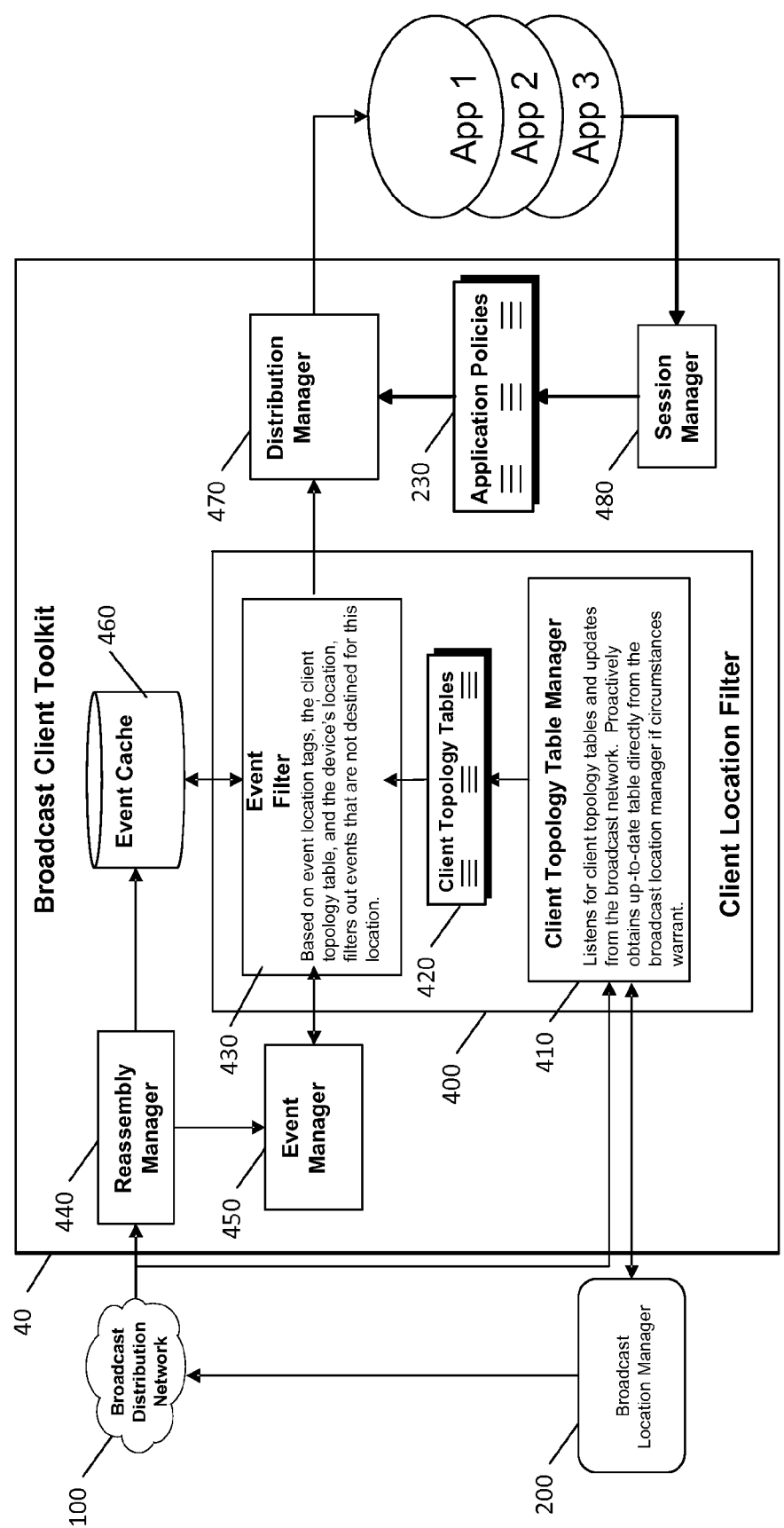
FIG. 4 is a functional block diagram of a client location filter.

FIG. 4 is a functional block diagram of a broadcast client toolkit 40 that is installed on a client device. The broadcast client toolkit 40 includes the client location filter 400, a reassembly manager 440, an event manager 450, an event cache 460, a distribution manager 470, the application-specific selection policies 230, and a session manager 480. The client location filter 400 enhances the location-independent client processing provided by the other components and described in U.S. patent application Ser. No. 11/626,707, filed on Jan. 24, 2007, and entitled "Reliable Event Broadcaster with Multiplexing and Bandwidth Control". Specifically, the reassembly manager 440 assembles larger objects from broadcast packets, the event manager 450 recognizes new events and provides notifications to the other components, the event cache 460 stores the payloads of received events, the session manager 480 accepts subscriptions from applications to event sessions, and the distribution manager 470 distributes received events to the appropriate applications on the client device, based on application-specific selection policies 230.

The client location filter 400 includes a client topology table manager 410, locally stored client topology tables 420, and an event filter 430. The client location filter 400 manages the locally stored client topology tables 420, and examines incoming events to determine whether or not to pass them along to applications that are registered to receive events from the event source.

The client topology table manager 410 obtains and maintains the client topology tables 420 on the client device. The client topology table manager 410 monitors a broadcast stream for the client topology tables 420. The client topology table manager 410 may monitor continuously, or at predetermined times or intervals. When a new client topology table 420 is available and is relevant to the client device, the client topology table manager 410 obtains the new table and stores it locally.

The client topology table manager 410 may proactively obtain a client topology table. This may be accomplished by directly requesting the client topology table from the broadcast location manager 200 when the client location filter 400 determines that it is missing a required table and may not be able to obtain one in a timely manner by monitoring the broadcast channel containing the client topology tables.

As discussed above, events received at the client location filter 400 may be tagged with location information. In such cases, the client location filter 400 determines if the event received is relevant to the client device's current location. The client location filter 400 makes the determination using the location tag imbedded in the event, the appropriate client topology table, and the client device's current location within the broadcast network.

Figure 5:
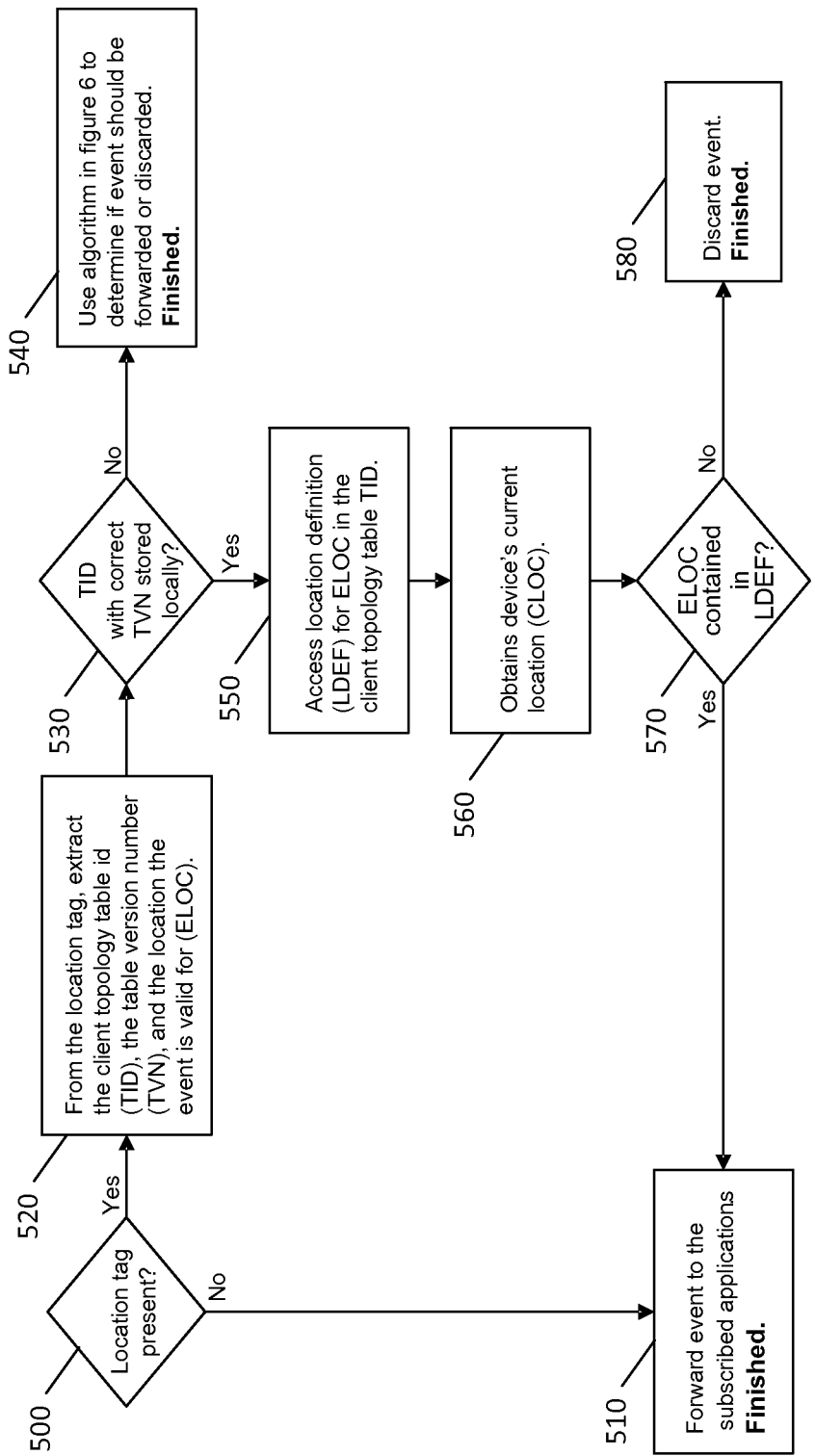
FIG. 5 is a flow diagram illustrating a method of executing an event filter algorithm.

The event filter 430 executes an algorithm to determine whether an event should be passed to applications (e.g., App 1, App 2, and/or App 3) that are registered to receive events from the event source. FIG. 5 is a flow diagram illustrating a method of executing the event filter algorithm. The execution of the algorithm begins when an event is received at the event filter and a determination is made whether a location tag is present in the event (step 500). If the event does not include a location tag, the fine-grained location of the client device is not relevant to the event. Thus, the event is forwarded to the applications that subscribe to the event (step 510). If the event includes a location tag, then the client topology table identifier, the table version number, and the event location are extracted from the tag (step 520).

A determination is made whether the client topology table identifier associated with the correct table version number is stored locally at the client device (530). Since the set of locations that are relevant to the event may be updated periodically, the client topology table may be outdated if the locations associated with the event have changed but the corresponding location definitions in the table have not been updated. If the corresponding table is not stored locally, or if the locally stored table is not the correct version, processing proceeds to FIG. 6 to determine if the event should be forwarded or discarded (step 540).

If the correct version of the client topology table is stored locally, the location definition that matches the event location is accessed from the client topology table (step 550). The type of location definition depends on which mechanism the client device uses to determine its location (e.g., a radio tower, a GPS receiver, etc.). For example, the location definition may be a set of zip codes or a GPS polygon. Since there are multiple ways that a client device may determine its location, multiple location definitions may be stored in the client topology table.

The current location of the client device is obtained (step 560). A determination is then made whether the client device's current location is within the location definition (step 570). If the client device's current location is within the location definition, the event is forwarded to the applications that subscribe to the event for processing (step 510). If the client device's current location is not within the location definition (i.e., the client device is in a part of the network that is not identified by the location tag), the event is discarded (580).

Figure 6:
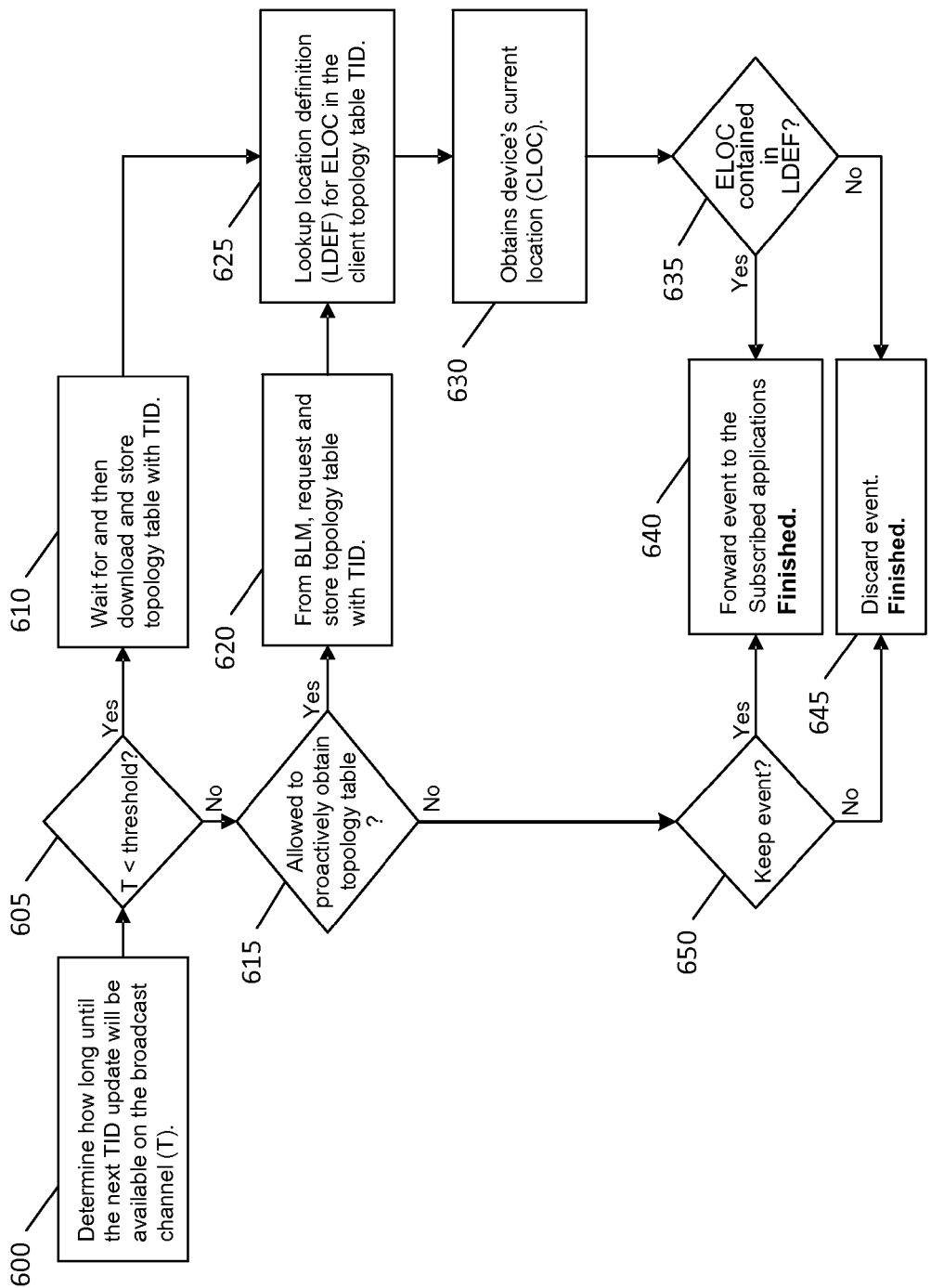
FIG. 6 is a flow diagram illustrating a method of performing event filtering when a current version of the client topology table is not locally stored on a client device.

FIG. 6 is a flow diagram illustrating a method of performing event filtering when a current version of the client topology table is not locally stored on a client device. First, a determination is made to identify when the next table update will be available from the broadcast channel that distributes client topology tables (step 600). If the client topology table will be available within a threshold as set by the service provider or built-in to the client device (step 605), the client topology table manager waits for and downloads the correct version of the client topology table (step 610). Processing then proceeds to step 625.

If the client topology table will not be available within the threshold as set by the service provider or built-in to the client device (step 605), a determination is made whether the client topology table manager is allowed to proactively obtain the table (step 615). If the client topology table manager is allowed to proactively obtain the table, the client topology table manager explicitly requests and obtains the most recent client topology table from the broadcast location manager (step 620).

The location definition that matches the event location is accessed from the client topology table (step 625). The current location of the client device is obtained (step 630). A determination is then made whether the client device's current location is within the location definition (step 635). If the client device's current location is within the location definition, the event is forwarded to the applications that subscribe to the event (step 640). If the client device's current location is not within the location definition, the event is discarded (645).

If the most recent version of the table is not available locally and can not be obtained within the threshold amount of time, a determination is made whether to discard or keep the event (step 650). The determination may be made based on one or more of: additional information available in the location tag; a service provider defined policy, or a policy that is built in to the client device. For example, if a determination can not be made whether the client device is in the correct location, the policy may determine that: 1) the event is processed; 2) the event is discarded; or 3) the event is not processed until the client device location is determined.

The location information attached to an event may be useful to an application (e.g., to inform the user of the region to which the event applies). Therefore, the distribution manager may make metadata corresponding to the location information available along with the content of the event. The application may communicate with the client topology table manager to interpret the location tag.

Figure 7:
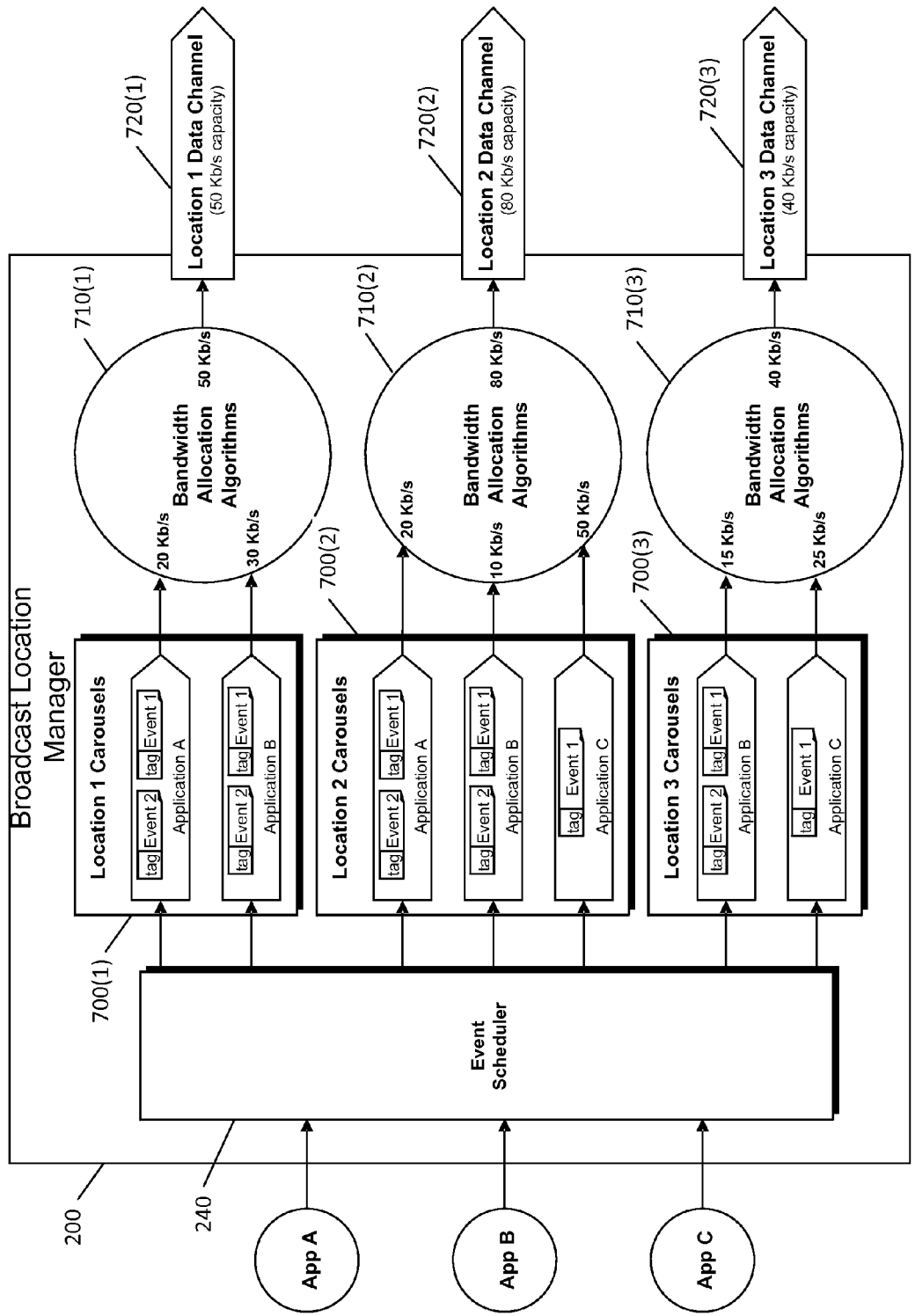
FIG. 7 is a functional block diagram of a broadcast location manager illustrating bandwidth allocation for a location-based broadcast server.

FIG. 7 is a functional block diagram of a broadcast location manager illustrating bandwidth allocation for a location-based broadcast server. The broadcast location manager 200 includes the event scheduler 240 and the location-specific application carousels 700. The location-specific application carousels 700 include location 1 carousels 700(1), location 2 carousels 700(2) and location 3 carousels 700(3). Each location carousel 700(1-3) is associated with a set of bandwidth allocation algorithms 710(1-3) and location data channels 720(1-3).

As shown in the figure, an application publishes one event that may be distributed to multiple broadcast locations. For example, application C sends the same event to locations 2 and 3, but does not send any events to location 1. Thus, the event for application C is provided to the location 2 carousel 700(2) and the location 3 carousel 700(3). Likewise, application A provides events to location 1 carousel 700(1) and the location 2 carousel 700(2), and application B provides events to all three location carousels 700(1-3).

Each broadcast location is associated with a particular bandwidth which may change depending on the events to be distributed. The bandwidth allocation algorithms 710(1-3) are executed for the corresponding location carousels 700(1-3) to optimize the bandwidth for each broadcast location. The bandwidth is allocated for each broadcast location independently because each data channel 720(1-3) may have a different capacity and a different number of events to be distributed from the location carousels 700(1-3). By executing the corresponding bandwidth allocation algorithm 710(1-3) for each broadcast location, bandwidth can be allocated such that an application may receive a better quality of service for one location relative to a different location. In other words, the allocation of bandwidth may be optimized for each location rather than tying bandwidth allocation to the worst case scenario.

For example, as shown in the figure, the location 3 data channel 720(3) is the slowest channel. However, the other location data channels 720(1) and 720(2) should not be restricted to the rate at which packets are being sent to location 3. In other words, if data packets are sent to locations 1 and 2 at the same rate at which data packets are sent to location 3, bandwidth is unnecessarily wasted for data transmission to locations 1 and 2. Since bandwidth is allocated for each broadcast location independently, a better quality of service is provided to applications for the packets being sent to locations 1 and 2 relative to location 3. By optimizing and multiplexing the bandwidth allocations separately, different packets are sent to each broadcast location even though each application only publishes one version of an event.

As is apparent from the above description, the present invention provides many advantages over conventional data broadcasting techniques. The server and client work together to provide fine-grained control over where events can be broadcast and received. Events may be directed to specific network locations either by server-side only means, client-side only means, or cooperative server-side and client-side means. Location specific addressing across multiple networks/protocols is abstracted at the server such that applications have one interface and one set of location specifics for all networks and protocols. The broadcasting of events is optimized based on the location specified by the application, and the union and/or intersection of addressable locations supported by the network. The delivery of client topology tables is optimized such that a portion of the table may be broadcast based on the broadcast location. In other words, parts of the client topology table that will not be used by the client device are not delivered to the client device because the client device is not present in those locations. Bandwidth resources may be restricted, allocated and shared among groups of applications on a location-by-location basis. Location-based carousels allow a single event broadcast by an application to be delivered to multiple network locations. The quality of service may be independently managed for each network location where applications are broadcasting events.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A method for filtering events, the method comprising:
receiving a plurality of events at a client device, wherein at least one event is associated with a location tag that identifies a physical location in a network, the physical location being smaller than an area served by the network;
identifying a client topology table corresponding to the location tag;
if the client topology table corresponding to the location tag is not stored on the client device, downloading the client topology table to the client device;
determining a physical location of the client device based at least in part on the client topology table; and
forwarding the event to an application in the client device if the physical location of the client device is within the physical location identified by the location tag.

2. The method of claim 1 further comprising:
determining whether the location tag is present in a received event; and
forwarding the received event to an application in the client device if the location tag is not present in the received event or if the location tag identifies all locations in the network.

3. The method of claim 1 further comprising:
extracting from the location tag a client topology table identifier, a version number of a client topology table, and the physical location.

4. The method of claim 3 further comprising:
determining whether a client topology table corresponding to the client topology table identifier and the version number extracted from the location tag is stored on the client device; and
accessing the client topology table from the client device if the client topology table is stored on the client device.

5. The method of claim 4 further comprising:
if the client topology table is not stored on the client device, downloading a current version of the client topology table from a broadcast location manager.

6. The method of claim 5 further comprising:
receiving the client topology table, wherein the client topology table corresponds to the location of the client device.

7. The method of claim 6 further comprising:
determining a location change of the client device, wherein the client topology table does not correspond to a current location of the client device; and
obtaining another client topology table that corresponds to the current location of the client device.

8. The method of claim 6 further comprising:
forwarding the client topology table and the location tag to the application in the client device.

9. The method of claim 1 wherein the physical location is served by a plurality of networks.

10. The method of claim 1 wherein the physical location comprises a plurality of non-contiguous locations served by at least one network.

11. A method for broadcasting events to fine-grained locations in a network, the method comprising:
- identifying a physical location in a network, wherein the physical location is smaller than an area served by the network;
- mapping the physical location to a network address;
- identifying a fine-grained location within the physical location, wherein an event is to be distributed to client devices within the fine-grained location;
- tagging events to be distributed to the fine-grained location with a location restriction such that at least one event is associated with a location tag identifying the fine-grained location and corresponding to a client topology table;
- broadcasting the events to the physical location via a broadcast distribution network;
- filtering the events based on the location restriction such that only client devices located within the fine-grained location process the events; and
- if the client topology table corresponding to the location tag is not stored at a client device, providing the client topology table to the client device.

12. The method of claim 11 further comprising:
- submitting the events that are to be transmitted to the same physical location to a carousel, wherein each event may be transmitted from the carousel at least once.

13. The method of claim 12 further comprising:
- allocating bandwidth to the events on the same carousel based on an aggregate bandwidth available to the corresponding physical location.

14. A method for broadcasting events to locations in a network, the method comprising:
- identifying a physical location in a network, wherein the physical location is smaller than an area served by the network;
- tagging events such that at least one event is associated with a location tag identifying the physical location and corresponding to a client topology table;
- mapping the physical location to a plurality of network addresses;
- broadcasting events to client devices in the physical location via a broadcast distribution network; and
- if the client topology table corresponding to the location tag is not stored at a client device, providing the client topology table to the client device.

15. The system of claim 14 further comprising:
- tagging the events to be distributed to a fine-grained location in the physical location with a location restriction; and
- filtering the events based on the location restriction such that only client devices located within the fine-grained location process the events.

16. The system of claim 14 wherein the plurality of network addresses correspond to locations in more than one network.

* * * * *